US008253688B2

(12) United States Patent
Bohn et al.

(10) Patent No.: US 8,253,688 B2
(45) Date of Patent: *Aug. 28, 2012

(54) MULTI-MODE OPTICAL NAVIGATION (75) Inventors: David Bohn, Fort Collins, CO (US); Krishna Darbha, Seattle, WA (US); Jim Marshall, Puyallup, WA (US); Brian L. Hastings, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 60 days.

This patent is subject to a terminal disclaimer.

(21) Appl. No.: 12/830,687

(22) Filed: Jul. 6, 2010

(65) Prior Publication Data

US 2010/0271306 A1 Oct. 28, 2010

Related U.S. Application Data (63) Continuation of application No. 11/426,048, filed on Jun. 23, 2006, now Pat. No. 7,777,722.

(51) Int. Cl.
*G09G 5/08* (2006.01)
*G01B 11/02* (2006.01)

(52) U.S. Cl. ........................................ 345/166; 356/499

(58) Field of Classification Search ........... 345/156–166
See application file for complete search history.

(56) References Cited

U.S. PATENT DOCUMENTS

| 4,631,400 | A | 12/1986 | Tanner |
| 7,221,356 | B2 * | 5/2007 | Oliver et al. .................. 345/166 |
| 7,295,186 | B2 * | 11/2007 | Brosnan ......................... 345/166 |
| 2005/0094154 | A1 * | 5/2005 | Baney et al. .................. 356/499 |
| 2005/0190144 | A1 | 9/2005 | Kong |
| 2006/0187208 | A1 | 8/2006 | Wenstrand |
| 2007/0091064 | A1 | 4/2007 | Cheah |
| 2008/0048983 | A1 | 2/2008 | Gordon |

* cited by examiner

*Primary Examiner* — Alexander S Beck
*Assistant Examiner* — Charles V Hicks
(74) *Attorney, Agent, or Firm* — Merchant & Gould (57) ABSTRACT

A system and method is provided for selecting a light source in a pointing device such as a mouse. The selection of the light source may be based on attributes of a received image, which are in turn based on reflected light received at the pointing device from the tracking surface. Because the attributes of the receive image are related to characteristics of the tracking surface over which the pointing device is moved, an illumination source appropriate for a particular surface type can be chosen.

18 Claims, 9 Drawing Sheets

MULTI-MODE OPTICAL NAVIGATION

BACKGROUND

Measuring motion in two or more dimensions is extremely useful in numerous applications. Computer input devices such as mice are but one example. In particular, a computer mouse typically provides input to a computer based on the amount and direction of mouse motion over a work surface (e.g., a desk top). Many existing mice employ an imaging array for determining movement. As the mouse moves across the work surface, small overlapping work surface areas are imaged. Processing algorithms within the mouse firmware then compare these images (or frames). The relative motion of the work surface can then be calculated by comparing surface features common to overlapping portions of adjacent frames.

Imaging can be performed in various ways. One imaging method involves grazing illumination in which light from an LED strikes a surface at a relatively shallow angle. The LED light beam striking the surface at the relatively shallow angle is reflected back to a light sensor. Features on the surface generate shadows, and an image frame composed of such shadows can be compared with other image frames to calculate direction and amount of motion.

Another imaging method utilizes specular illumination. In this method, a highly focused LED or a coherent light source (e.g., a laser) strikes a surface at a less shallow or "deep" angle with respect to the surface being imaged.

Each of the above described techniques works better for certain types of surfaces. For example, a specular light source providing an incident light beam at a deep angle with respect to a surface usually provides better tracking images if the surface is glossy or highly reflective. However, specular-image tracking may not work as well if the surface is non-glossy or not highly reflective. Conversely, tracking based on images from a grazing illumination light source is generally more effective if the surface is not highly reflective and/or relatively rough.

SUMMARY

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In at least some embodiments, an input device can select an illumination source and corresponding tracking algorithm for generating an image and providing improved tracking for a particular surface. In one example, an input device is provided for tracking a tracking surface and includes a controller for selecting a light source based on an attribute of a received image from a tracking surface. For example, the input device may include at least two light sources for illuminating a surface external to the input device and track motion of the input device over the surface. Also, the input device may select a light source for providing illumination based on a detected attribute of the surface. In one example, the attribute includes one of image contrast and illumination.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Various exemplary embodiments will be described in the context of a tracking system used to measure movement of a computer mouse relative to a desk top or other work surface. However, the invention is not limited to implementation in connection with a computer mouse. Indeed, the invention is not limited to implementation in connection with a computer input device.

Figure 1:
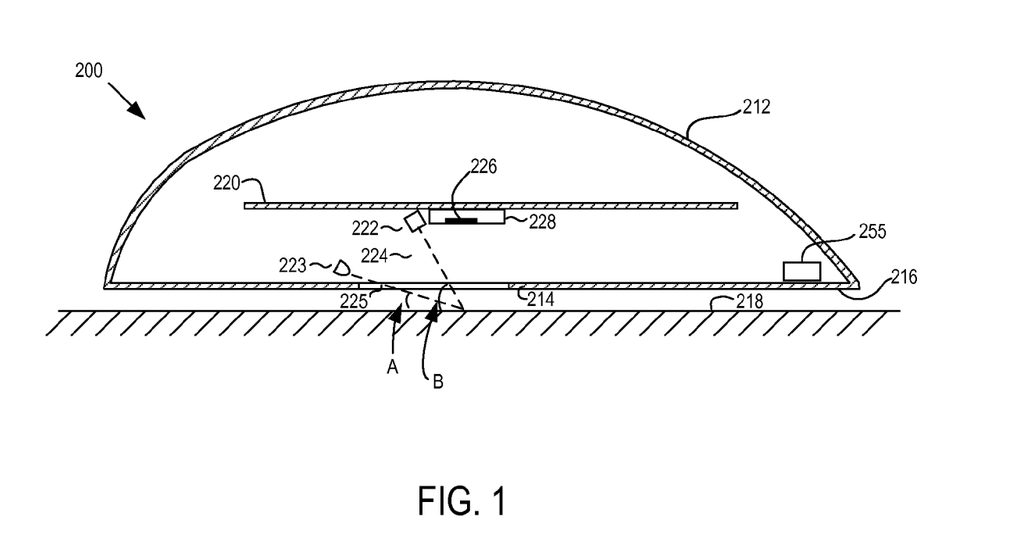
FIG. 1 shows a computer mouse according to at least one exemplary embodiment.

FIG. 1 shows a computer mouse 200 according to at least one exemplary embodiment. Computer mouse 200 includes a housing 212 having an opening 214 formed in a bottom face 216. Bottom face 216 is movable across a work or tracking surface 218. For simplicity, a small space is shown between bottom face 216 and work surface 218 in FIG. 1. In practice, however, bottom face 216 may rest flat on surface 218. Located within mouse 200 is a printed circuit board (PCB) 220. Positioned on an underside of PCB 220 is a first light source 223. In the embodiment of FIG. 1, first light source 223 is an LED. The first light source 223 directs a beam 225 at a portion of surface 218 visible through opening 214. Beam 225, which may include light of a visible wavelength and/or light of a non-visible wavelength, strikes tracking surface 218 and is reflected into an array 226 of a motion sensing integrated circuit (IC) 228.

Beam 225 from the first light source 223 provides grazing illumination such that the beam 225 strikes the tracking surface 218 at a relatively shallow angle (i.e., angle A as illustrated in FIG. 1). Angle A is a relatively small angle such that the beam 225 "grazes" the tracking surface 218. For example, angle A may be approximately 20°. In another example, angle A may have other values less than 30° (e.g., 28°, 26°, 25°, 23°, 20°, 19°, 18°, 17°, 16°, 15°, 14°, 13°, 12°, 11°, 10°, 9°, 8°, 7°, 6°, 5°, etc.). Angle A could also be greater than 30° (e.g., 31°, 32°, 33°, 34°, 35°, 36°, 37°, etc.). The grazing illumination from the first light source 223 creates an image pattern that is reflected into and detected by the array 226. For example, if the tracking surface 218 is a non-glossy surface, the first light source 223 may generate shadows among surface features of an illuminated portion of tracking surface 218.

In the embodiment of FIG. 1, grazing light source 223 is an LED. In other embodiments, a laser can be used as a grazing light source. A diffuser, spreader or other optical elements can be interposed between a grazing light source (whether LED or laser) and the tracking surface.

The mouse 200 further includes a second light source 222 positioned underneath the PCB 220. In the embodiment of FIG. 1, the second light source 222 is a vertical cavity surface emitting laser (VCSEL). When activated, the second light source 222 directs a beam 224 at a portion of surface 218 visible through opening 214. In the embodiment of FIG. 1, the second light source 222 is positioned to emit light beam 225 to strike a point on the tracking surface 218 that is coincident with beam 225 from the first light source 223. However, this need not be the case. Similar to beam 225 from the first light source 223, light beam 224 from the second light source 222 may include light of a visible wavelength and/or light of a non-visible wavelength. Light from beam 224 strikes tracking surface 218 and is reflected into array 226 of motion sensing integrated circuit (IC) 228.

Light beam 224 from the second light source 222 strikes the tracking surface 218 at an angle that is different from the angle formed by the light beam 225 from the first light source 223. As set forth above, the light beam 225 from the first light source 223 is a grazing light beam and forms an angle A that is relatively shallow relative to the tracking surface 218. The light beam 224 from the second light source 222 strikes the tracking surface 218 at an angle B that is larger than angle A. In other words, light beam 224 from the second light source 222 is more normal (i.e., closer to being perpendicular) to the tracking surface 218. However, light beam 224 from the second light source 222 need not actually be perpendicular to the tracking surface 218. As illustrated in FIG. 1, light beam 224 may in some embodiments be within approximately 5-30 degrees of normal (perpendicular) to the tracking surface. In one embodiment, the light beam 224 from the second light source strikes the tracking surface such that the light beam 224 forms an angle with the normal axis (i.e., perpendicular orientation with respect to the tracking surface 218) that is approximately 20°. In other embodiments, the angle relative to the normal axis has other values less than 30° (e.g., 28°, 26°, 25°, 23°, 21°, 19°, 18°, 17°, 16°, 15°, 14°, 13°, 12°, 11°, 10°, etc.). In yet other embodiments, the angle with the normal axis is greater than 30° (e.g., 31°, 32°, 33°, 34°, 35°, 36°, 37°, 38°, 39°, etc.).

The second light source 222 provides specular illumination in which the light reaching array 226 has, when the portion of tracking surface 218 illuminated by light source 222 is sufficiently glossy or otherwise has the proper characteristics, a high frequency pattern of bright and dark regions. That high frequency pattern is the result of the specular illumination and reflection from the surface variations of the tracking surface, and generally causes the intensity of light falling on different parts of array 226 to vary. These patterns allow tracking motion of surface 218 relative to mouse 200.

In the embodiment of FIG. 1, specular light source 222 is a VCSEL. Other types of laser sources could be used for the specular light source. Indeed, specular light source 222 is not a laser in some embodiments. For example, some embodiments utilize a highly collimated non-coherent LED as a specular light source. As also seen in the embodiment of FIG. 1, angles A and B of beams 225 and 224, respectively are achieved by positioning of the light sources 222 and 222 such that the beams are emitted from those sources at the desired orientation. In other embodiments, light source 223 and/or 222 may have a different orientation within mouse 200. In such an embodiment, the desired angle A and/or the desired angle B are achieved by routing the light source output through one or more light guides, prisms and/or other optical elements.

Figure 2:
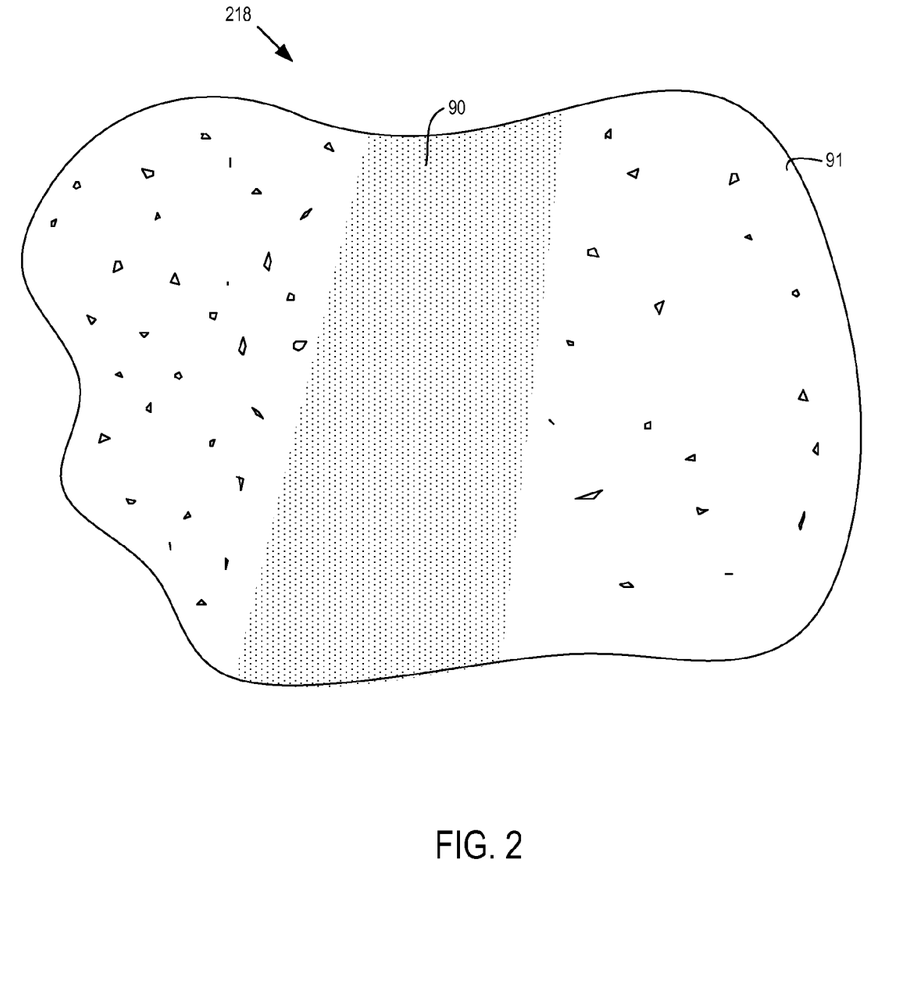
FIG. 2 is a diagram illustrating the tracking surface shown in FIG. 1.

FIG. 2 shows tracking surface 218. In this example, the tracking surface 218 contains at least two types of surfaces (90,91). Surface 90 is a glossy surface having a high reflectivity. Surface 91 is a surface that is less reflective or glossy than surface 90. Grazing illumination may provide improved imaging over surface 91 whereas specular illumination or illumination striking the tracking surface 218 at a more normal angle may provide improved imaging over surface 90. As an input device is tracked over tracking surface 218 (portion 90 or 91), mouse 200 provides illumination using a method that is better suited for the type of surface being tracked. For example, if the mouse 200 is tracked over portion 91, the first light source 223 provides grazing illumination at a relatively shallow angle to the tracking surface. Conversely, when the mouse 200 of FIG. 1 is tracked over portion 90, the second light source 222 provides illumination via a light beam that strikes the portion 90 at a more normal (i.e., more perpendicular) angle to the tracking surface 218 as compared to the angle of the first light source 223.

A light source (and a corresponding tracking algorithm to be performed by IC 228) can be chosen in various manners. In some cases, a light source and corresponding tracking algorithm may be selected based on a selection criteria. The selection criteria may be any criteria or signal such as a manual input (e.g., a switch position or other user input) or automatic selection based on other selection criteria pertaining to the device or tracking surface. In some cases, the illumination method (and corresponding tracking algorithm) used in the mouse 200 may be changed or switched manually. In particular, the mouse 200 may include a manual switch 255 which a user may activate to switch from one light source and tracking algorithm to another light source and tracking algorithm. Manual switching can be used, e.g., when a user intends to operate mouse 200 on a surface that is entirely composed of a surface type suitable for grazing illumination (e.g., an unvarnished wood desk top) or on a surface that is entirely composed of a surface type suitable for specular illumination (e.g., a varnished and polished wood surface). Placing switch 255 in one position causes mouse 200 to solely illuminate with the first light source 223 and to use a corresponding tracking algorithm. Placing switch 255 in a second position causes mouse 200 to illuminate solely with second light source 222 and to use another corresponding tracking algorithm. Placing switch 255 in a third position causes mouse 200 to automatically select the best illumination method and corresponding tracking algorithm. As described in more detail below, mouse 200 can automatically select the best illumination source (and corresponding tracking algorithm) based on attributes of light received by array 226. In other embodiments, mouse 200 does not have a switch 255, and illumination method is always selected automatically. In yet other embodiments, no automatic illumination selection is performed. In some such embodiments, switch 255 is only a two position switch, with each position selecting one of two available illumination methods.

Figure 3:
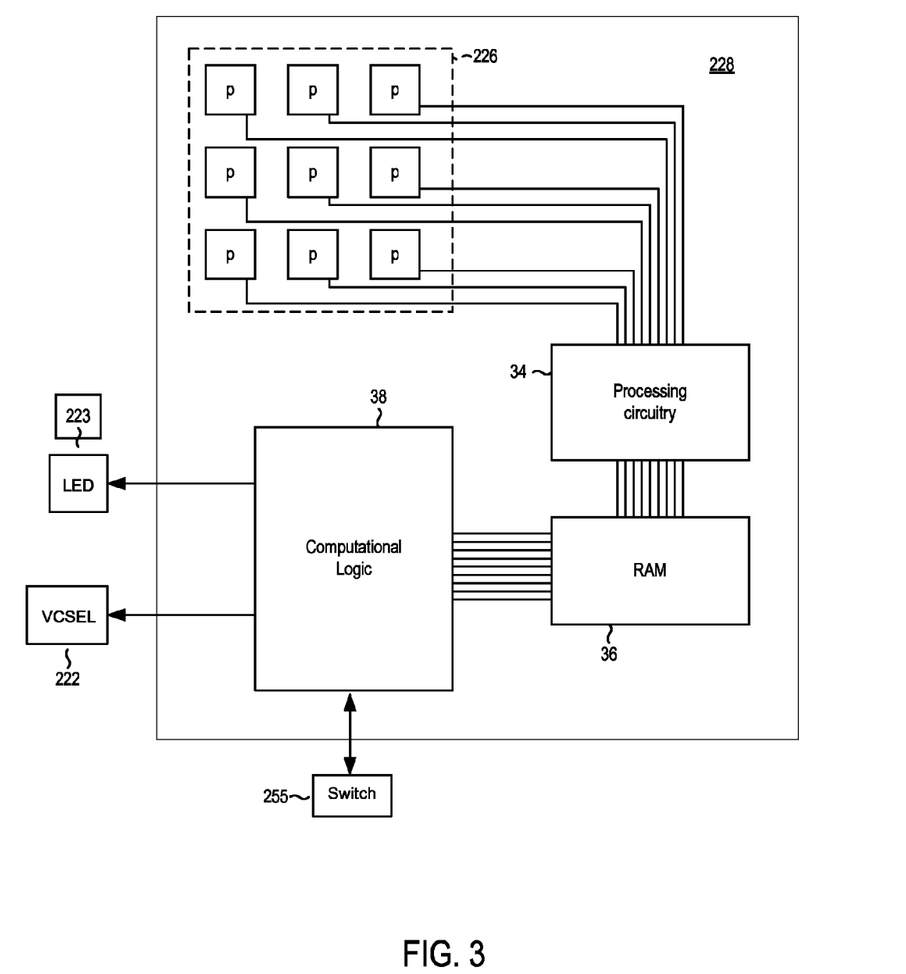
FIG. 3 is a partially schematic block diagram of an integrated circuit of the mouse in FIG. 1.

FIG. 3 is a partially schematic block diagram of IC 228. Array 226 of IC 228 includes a plurality of pixels p. Each pixel p is a photodiode or other photosensitive element which has an electrical property that varies in relation to the intensity of received light. For simplicity, only nine pixels are shown in FIG. 3. Array 226 may have many more pixels, and those pixels may be arranged in a variety of different ways. At multiple times, each pixel outputs a signal (e.g., a voltage). The raw pixel output signals are amplified, converted to digital values and otherwise conditioned in processing circuitry 34. Processing circuitry 34 then forwards data corresponding to the original pixel output signals for storage in RAM 36.

Computational logic 38 then accesses the pixel data stored in RAM 36 and calculates motion based on that data. Computational logic 38 employs one algorithm for tracking motion when illumination is from first source 223 and a different motion tracking algorithm illumination is from second source 222.

In one example, the same array may be used for detecting and characterizing different types of illumination. For example, if a first light source provides grazing illumination and a second light source provides specular illumination, one array may be used to detect both types of illumination. In another example, a different array may be used for detecting and characterizing different types of illumination. For example, a first light source may provide grazing illumination that is detected by a first sensor and a second light source may provide specular illumination that is detected by a second sensor. In this example, the first sensor does not detect specular illumination and the second sensor does not detect the grazing illumination. In yet another example, both any number of types of illumination may be detected by an array in which the array determines a configuration corresponding to the received illumination or light. For example, an array may have a corresponding configuration including pixel size, number of pixels, etc. in which a particular type of illumination may be detected and recognized. Various algorithms are known for tracking motion based grazing illumination images and for tracking motion based on specular illumination images, and the details of such algorithms are therefore omitted. Similarly, and because numerous specific circuits for capturing values from a set of photosensitive pixels are known in the art, additional details of IC 228 are also omitted. Notably, FIG. 3 generally shows basic elements of circuitry for processing, storing and performing computations upon signals obtained from an array. Numerous other elements and variations on the arrangement shown in FIG. 3 are known to persons skilled in the art. For example, some or all of the operations performed in processing circuitry 34 could be performed within circuit elements contained within each pixel. At least some herein-described embodiments are directed to details of calculations, performed within computational logic 38, for determining which illumination source (and corresponding tracking algorithm) to select. Adaptation of known circuits to include the necessary pixel arrangements and perform such calculations (together with motion tracking algorithm computations and other computations) are within the routine abilities of persons of ordinary skill in the art once such persons possess the information provided herein.

As also shown in FIG. 3, light sources 222 and 223 are controlled by IC 228. Specifically, IC 228 selectively activates and deactivates light sources 222 and 223. For simplicity, FIGS. 1 and 3 only illustrate two light sources; however, any number of light sources may be controlled by IC 228. The computational logic 38 selects the light source and activates the selected light source to provide illumination to the tracking surface. In one example, light received and detected at array 226 is processed in the processing circuitry 34 so as to determine whether to continue using a currently active illumination source or whether to change to another source. Based on attributes of the received light, the computational logic 38 selects the appropriate one of light sources 223 or 222. Selection and activation or deactivation of light sources based on input signals received at the array 226 are described in more detail below.

Figure 4:
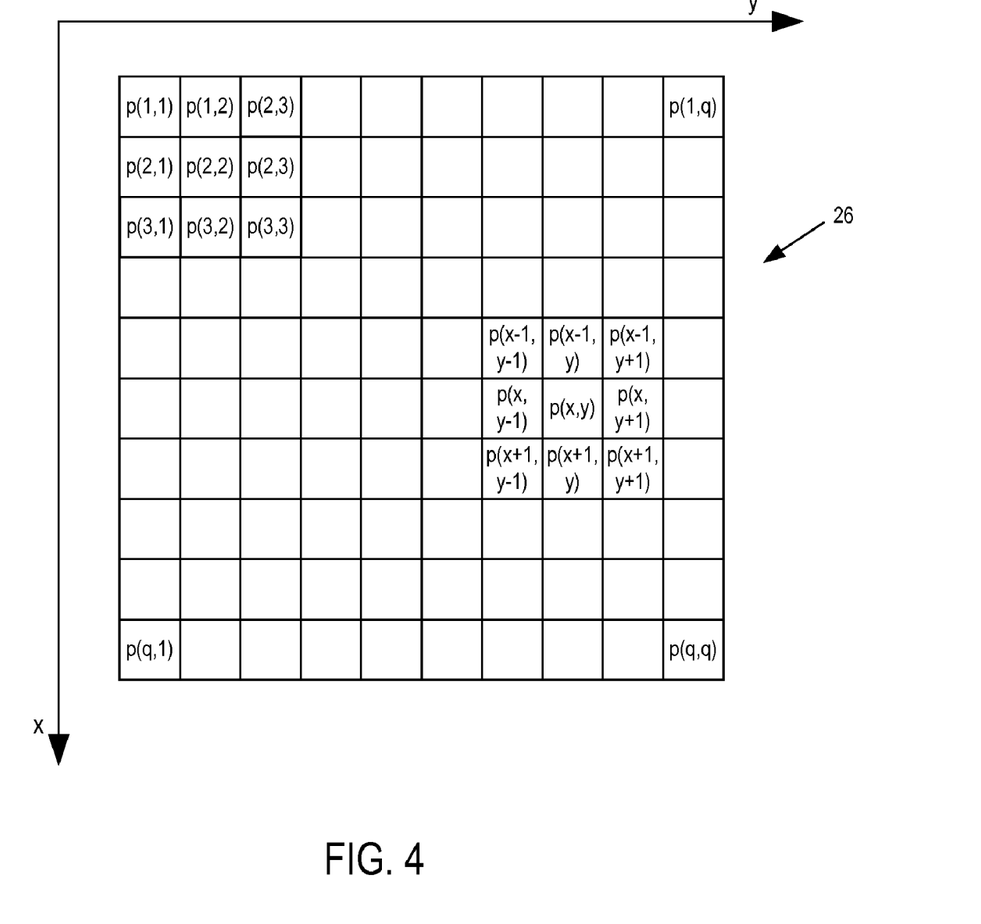
FIG. 4 is a partially schematic diagram of an array in the mouse of FIG. 1.

FIG. 4 is a partially schematic diagram of array 226 taken from the position indicated in FIG. 1. For convenience, pixels in array 226 are labeled p(r,c) in FIG. 4 where r and c are (respectively) the indices of the row and column where the pixel is located relative to the x and y axes. In the embodiment of FIGS. 1 through 4, array 226 is a q by q array, where q is an integer. The unnumbered squares in FIG. 4 correspond to an arbitrary number of additional pixels. In other words, and notwithstanding the fact that FIG. 4 literally shows a ten pixel by ten pixel array, q is not necessarily equal to ten in all embodiments. Indeed, array 26 need not be square. In other words, array 26 could be a q by q' array, where q≠q'.

As set forth above, the mouse 200 of FIG. 1 is capable of switching manually or automatically from one light source to another light source. The mouse 200 may track a tracking surface 218 containing multiple different types of surfaces as illustrated in FIG. 2. The tracking surface 218, for example, may contain a first portion 91 that is not highly reflective and a second portion 90 that is highly reflective. When the mouse 200 tracks over the first portion 91 of the work surface 218, the first light source 223 may produce a light incident on the work surface 218 for grazing illumination. Hence, the first light source 223 directs a beam 225 at the first portion 91 of work surface 218 visible through opening 214. When the mouse is tracked over the second portion 90 of the tracking surface 218, the mouse 200 may deactivate the first light source 223 and activate the second light source 222 such that illumination is now provided by the second light source at a more normal (i.e., closer to perpendicular) angle with respect to the tracking surface 218. In the embodiment of FIGS. 1-4, only one of light sources 222 and 223 is emitting light at a time (except for brief overlap periods when switching between light sources). Which light source emits light is determined by attributes of light received in array 226.

One example of such an attribute is the amount of light (or the illumination level) received by array 226. The illumination level, which can be gauged based on the overall output of pixels in array 226, may depend on many factors (e.g., intensity of the illumination source, exposure time, the optical path between the illumination source and the array, etc.). However, for a given mouse having a known combination of components and activating a known light source for a known period of time, illumination level can generally be used to indicate what type of surface is being struck with that light source. For example, a laser striking a glossy or highly reflective surface will usually result in a higher illumination level than might result from a laser striking a non-glossy/lesser reflective surface. Similarly, an LED striking a rough surface at a grazing angle will usually result in a higher illumination level than might result from that LED striking a glossy or highly reflective surface.

The illumination source may be pre-determined and set to a fixed value, and the sensor may adjust. In this example, the sensor may adjust by changing the integration time. The amount of light each illumination source and corresponding sensor receives may thus depend on the configuration. In one example, an LED-based glancing illumination method has shallow angle illumination, with the sensor positioned directly above the illuminated area (normal to surface). In this case, a relatively rough and diffuse surface may appear bright because the light is being more uniformly scattered from the surface in all directions. If, however, the surface is relatively shiny, then much of the light striking the surface may be reflected directly along the specular angle. In this case, relatively little light reflects straight up to the sensor. Therefore, in this case, the surface may appear darker to the sensor (from less light received). In yet another example, the illumination source and sensor may be positioned directly on the specular angle. In this case, relatively shiny surfaces may get the most light back to the sensor and diffuse surfaces may get the least light back to the sensor.

A predetermined threshold may be set such that when an illumination level is above the predetermined threshold with a selected light source, that light source may continue to be used by the mouse or other input device to image a tracking surface. For example, if the illumination level is above the predetermined threshold level when an LED light source is used for grazing illumination, the use of the LED light source may continue to be used in tracking the surface. When the illumination level drops below the predetermined threshold, however, the mouse or other input device may switch from the LED light source to a different light source so that the illumination threshold may increase to a level above the predetermined threshold. For example, if an LED light source is being used in grazing illumination and the illumination level drops below the predetermined threshold level, then the mouse or other input device may switch to a laser light source for specular imaging such that the illumination level rises above the predetermined threshold level. The actual threshold values may be different for different types of illumination (e.g., different for LED illumination, laser illumination, etc.). Also the threshold values may be set to any desired level so that improved imaging may be accomplished on a variety of different types of surfaces.

Image contrast is another attribute of light received at array 226 which can be used to determine light source and tracking method. In one example, image contrast may be determined using auto-correlation. For example, FIG. 4 illustrates an example of an array of pixels arranged in X rows and Y columns. For illustration purposes, the pixels are labeled in FIG. 4 as p(x,y), where the x and y parameters indicate the row and column of the pixel, respectively, within the array.

As illustrated in the example of FIG. 4, each non-edge pixel (i.e., each pixel that is not on an edge of the array) is surrounded by 8 neighboring pixels. For example, pixel p(2,2) in FIG. 4 is surrounded by pixels p(1,1), p(1,2), p(1,3), p(2,1), p(2,3), p(3,1), p(3,2), and p(3,3). In general, and as shown in FIG. 4 for an arbitrary location in array 226, each non-edge pixel p(x,y) is surrounded by eight other pixels as follows:

| p(x − 1, y − 1) | p(x − 1, y) | p(x − 1, y + 1) |
| p(x, y − 1)     | p(x, y)     | p(x, y + 1)     |
| p(x + 1, y − 1) | p(x + 1, y) | p(x + 1, y + 1) |

An adjacent pixel or neighboring pixel may be described generally by p(x+i, y+j), where i and j can each be −1, 0, or 1. A difference between any pixel in an image frame and one of its neighboring pixels may be determined by Equation 1.

$$\text{Diff}(i,j) = \text{Out}[p(x,y)] - \text{Out}[p(x+i, y+j)] \quad \text{Equation 1}$$

In Equation 1, Out[p(x,y)] and Out[p(x+i, y+j)] are the digitized outputs of pixels p(x,y) and p(x+i , y+j), respectively. In at least one embodiment, a difference between pixel outputs alternately may be expressed as an absolute value of a difference (shown in Equation 2) or as a difference squared (Equation 3).

$$\text{Diff}(i,j) = \text{ABS}[\text{Out}[p(x,y)] - \text{Out}[p(x+i, y+j)]] \quad \text{Equation 2}$$

$$\text{Diff}(i,j) = [\text{Out}[p(x,y)] - \text{Out}[p(x+i, y+j)]]^2 \quad \text{Equation 3}$$

Using Equation 2 or Equation 3, the differences between all non-edge pixels in array 226 of FIG. 4 and their respective i,j neighbors can be expressed as shown in Equation 4 or Equation 5.

$$AC(i, j) = \sum_{x=2}^{q-1} \sum_{y=2}^{q-1} [\text{ABS}(\text{Out }(p(x, y)) - \text{Out }(p(x+i, y+j)))] \quad \text{Equation 4}$$

$$AC(i, j) = \sum_{x=2}^{q-1} \sum_{y=2}^{q-1} [\text{Out }(p(x, y)) - \text{Out }(p(x+i, y+j))]^2 \quad \text{Equation 5}$$

AC in Equations 4 and 5 represents an autocorrelation value. Equations 4 and 5 are only two examples of manners in which an autocorrelation values may be obtained. Other techniques for calculating an autocorrelation value could be employed.

Using all combinations of i and j between −1 and 1, eight autocorrelation values may be obtained for a given image frame: AC(−1,−1), AC(−1,0), AC(−1,1), AC(0,−1), AC(0,1), AC(1,−1), AC(1,0), AC(1,1). Because AC(0,0) is a comparison of a pixel to itself, it would be expected to have a value of zero, and is thus ignored. The AC values are then used to calculate image contrast. For example, an image with poor or low contrast would have relatively low AC values; an image with high contrast would have relatively high AC values. A contrast metric can be calculated with the AC values. As one example, the contrast metric may be an average of the eight AC values associated with a given image.

Figure 5:
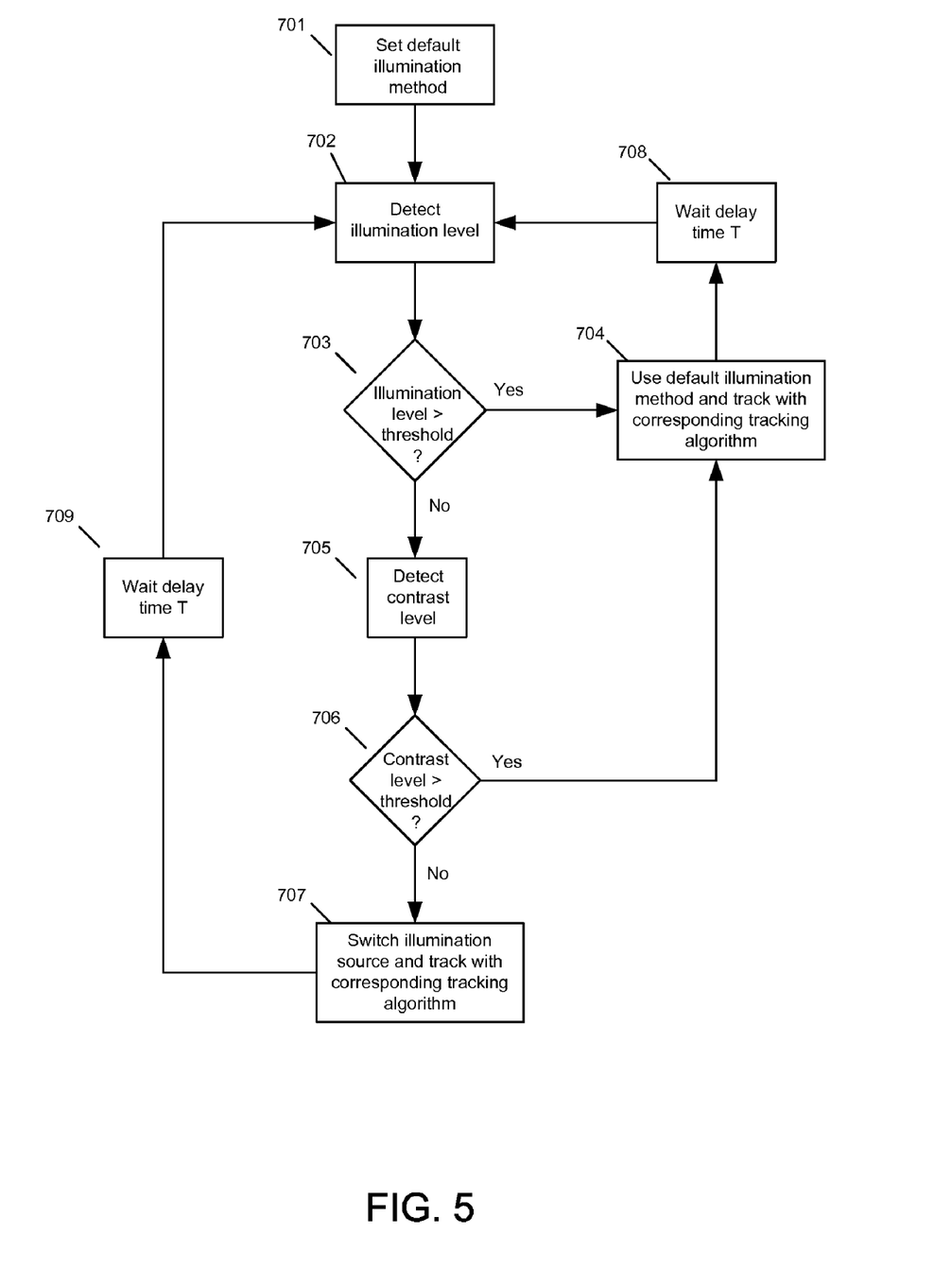
FIG. 5 is a flowchart that illustrates an example of determining an illumination method and tracking algorithm according to at least one embodiment.

In at least some embodiments, the choice of illumination source is determined by evaluating both the illumination level and the image contrast. FIG. 5 is a flowchart that illustrates an example of determining an illumination method based on the illumination level and contrast of a received image. In STEP 701, a default illumination source (and corresponding tracking algorithm) is selected. For example, the default illumination source in mouse 200 may be set to LED 223, and a tracking algorithm corresponding to grazing illumination employed. Alternatively, the default illumination source may be set to VCSEL 222, and a tracking algorithm corresponding to specular illumination employed.

In STEP 702, the illumination level is determined In STEP 703, the detected illumination level is compared to a predetermined threshold value for illumination. If the value from STEP 702 is higher than the predetermined threshold value, then the default illumination source and the corresponding tracking algorithm (STEP 704) may be used. After waiting a delay time T (STEP 708), the illumination level may be detected again (STEP 702) to determine if the illumination level has changed relative to the predetermined threshold value. If the value is lower than the predetermined threshold, then the contrast is determined (STEP 705). In determining the contrast, AC values may be determined and used in a metric as described above. The contrast is compared to a threshold value (STEP 706). If the contrast is less than a predetermined threshold value, then the illumination source and tracking algorithm are changed (STEP 707). However, if the contrast is higher than the predetermined contrast threshold value, then use of the default illumination method and tracking algorithm are continued (STEP 704). After the illumination source and tracking algorithm are changed in STEP 707, further changes in the illumination level may be detected (STEP 702). As illustrated in this example, after waiting a delay time T (STEP 709), further changes in the illumination level may be detected.

Figure 6:
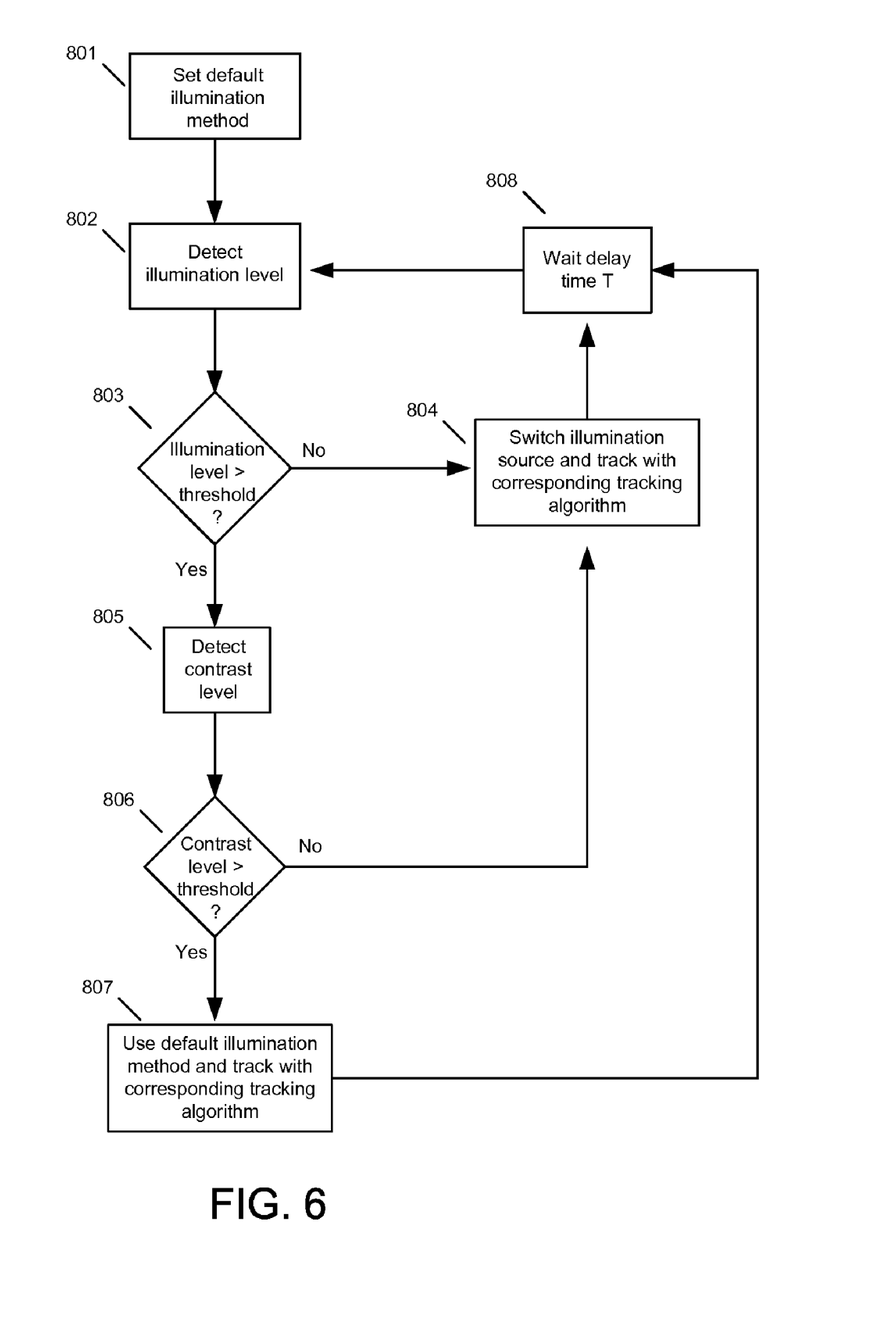
FIG. 6 is a flowchart illustrating another example of determining an illumination method according to another embodiment.

In an alternative method, the illumination method and tracking algorithm may be switched when either the illumination level or the contrast falls below a predetermined threshold. FIG. 6 is a flowchart illustrating one example of such a method. In STEP 801, a default illumination method and corresponding tracking algorithm are selected. Based on the default illumination method, the illumination level of a tracking surface is detected (STEP 802). For example, if an LED and grazing illumination is selected as the default illumination method, the illumination of the tracking surface based on grazing illumination from the LED light source is calculated. The calculated illumination level is compared to a predetermined threshold illumination level (STEP 803). If the calculated illumination level is less than the predetermined threshold illumination level, then the illumination method and tracking algorithm are switched to an alternative illumination method and tracking algorithm (STEP 804). After waiting a delay time T (STEP 808), subsequent changes in the illumination method may be detected (STEP 802).

If in STEP 803 the detected illumination level based on the default illumination method is higher than the predetermined threshold, then the image contrast of the tracking surface is calculated (STEP 805) and compared to a predetermined threshold contrast value (STEP 806). Contrast can be calculated using autocorrelation as described above. If the calculated image contrast is less than the predetermined threshold contrast levels, then the illumination method and tracking algorithm are changed (STEP 804). After waiting a delay time T (STEP 808), the process may repeat to determine any subsequent changes in illumination level (STEP 802) and/or contrast level (STEP 805). Alternatively, if the calculated contrast level is higher than the predetermined contrast threshold, then use of the default illumination method and its corresponding tracking algorithm are continued (STEP 807). After waiting a delay time T (STEP 808), the process may repeat to detect other changes in illumination level and/or contrast level.

In at least some embodiments, a mouse such as mouse 200 implements the algorithm of FIG. 5. In at least some other embodiments, a mouse such as mouse 200 implements the algorithm of FIG. 6. In some embodiments, the algorithm of FIG. 5 or FIG. 6 may be implemented in the IC 228 of FIGS. 1 or 3.

Figure 7:
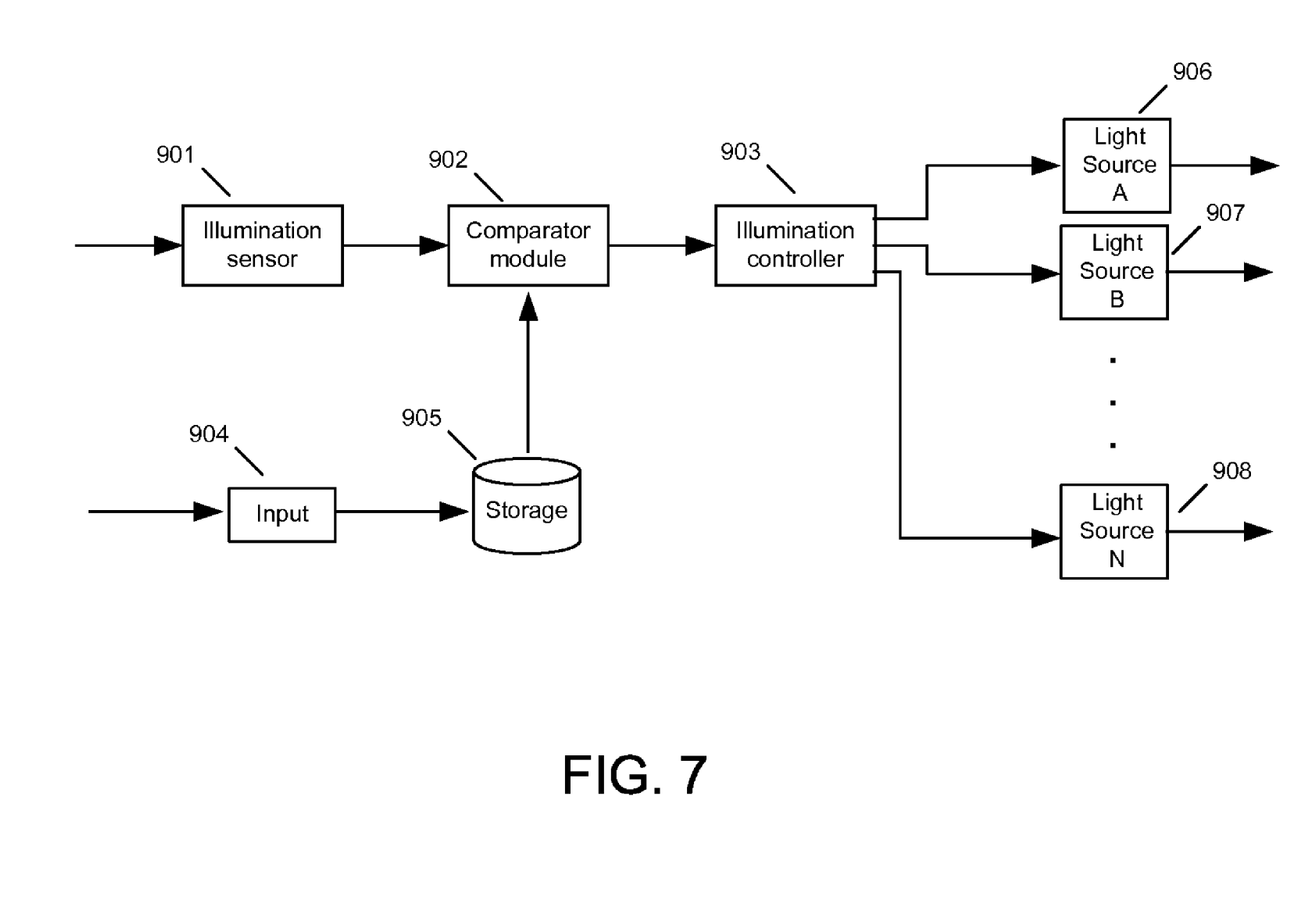
FIG. 7 is a block diagram illustrating an example of an apparatus for selecting an illumination method according to one embodiment.

FIG. 7 is a block diagram illustrating an example of an apparatus for selecting an illumination method and corresponding tracking algorithm in an input device such as a mouse. The apparatus may include an illumination sensor 901 that receives an image input from a tracking surface. In some cases, the illumination sensor 901 may be contained in an array similar to array 226 illustrated in FIG. 3. The array may further be contained in an IC similar to IC 228 as illustrated in FIG. 3 that may further contain computational logic and processing circuitry such as computational logic 38 and processing circuitry 34, illustrated in FIG. 3. The computational logic and processing circuitry may determine and select a light source and corresponding tracking algorithm. Light may be reflected from the mouse to the tracking surface and may be reflected back to the mouse and received at the illumination sensor 901. In addition, the apparatus may optionally include an input 904 for receiving a selection criteria that may be used in selecting a light source and corresponding tracking algorithm. For example, the input 904 may include a switch that may be similar to the switch 255 illustrated in FIG. 3. Alternatively, the input 904 may include a user interface in which a user may input a desired threshold value for the illumination level. For example, a user may input a desired threshold value via input 904. The desired threshold value may be stored in storage 905. In another example, a predetermined threshold value may be pre-stored in storage 905 without user input.

The input image illumination received at the illumination sensor 901 may be compared to the illumination threshold value in storage 905 by a comparator module 902. In some examples, the comparator module may be housed in an IC, such as an IC similar to IC 228 illustrated in FIG. 3. For example, the comparator module 902 may be contained in computational logic on the IC similar to the computational logic 38 illustrated in FIG. 3. The comparator module 902 may receive the image illumination from the illumination sensor 901 and retrieves the stored illumination threshold from storage 905. The comparator module 902 further determines if the received image illumination is less than or greater than the stored illumination threshold value. The comparator module 902 may also provide the comparison data to the illumination controller 903. The illumination controller 903 may also be contained in the computational logic 38 the IC. Based on the comparison data from the comparator module 902, the illumination controller 903 may control any number or type of light sources. In this example, the illumination controller 903 controls a plurality of light sources (e.g., Light Source A 906, Light Source B 907 and Light Source N 908). In some cases, the different light sources may be of different types and/or may be positioned at different angles with respect to the tracking surface.

In one example, light is provided to the tracking surface via light source A 906. Also, the comparator module 902 determines that the illumination threshold value from storage 905 is less than the illumination level of the received image at the illumination sensor 901 which corresponds to the reflected light from light source A 906. Based on this determination at the comparator module 902, the illumination controller 903 may control light source A 906 to provide light to the tracking surface and may also select a tracking algorithm corresponding to light source A 906. Also, the illumination controller 903 may control the other light sources (i.e., light source B 907-light source N 908) not to provide light to the tracking surface (i.e., the illumination controller 903 may ensure that light source B 907 and light source 908 remains in an off state).

In another example, light is provided to the tracking surface via light source A 906, however, the comparator module 902 determines that the illumination threshold value from storage 905 is greater than the illumination level of the received image at the illumination sensor 901 which corresponds to the reflected light from light source A 906. Based on this determination at the comparator module 902, the illumination controller 903 may control light source A 906 to terminate (i.e., may turn off light source A 906) and may control a different light source, such as light source B 907 or light source N 908 to emit light to the tracking surface (i.e., turn on a different light source). Also, the illumination controller 903 may select a tracking algorithm corresponding to the controlled light source (e.g., light source B 907 or light source N 908). For example, if light source A 906 emits light to the tracking surface which is reflected back to the mouse and received at illumination sensor and the received illumination signals received at the illumination sensor 901 are determined to be less than the threshold illumination values in storage 905 by the comparator module 902, then the illumination controller 908 (based on input from the comparator module 902) may select a different light source such as light source B 907 or light source N 908, and corresponding tracking algorithm. The selection of an alternate light source and corresponding tracking algorithm may be based on attributes of the light source. For example, the attributes may include illumination level, the type of light source or the position of the light source in the mouse relative to the tracking surface. Also, in addition to the illumination level, the light source may be selected based on contrast level of the illumination. For example, the light source may be selected based on both the illumination level and the contrast level of the light source.

Figure 8:
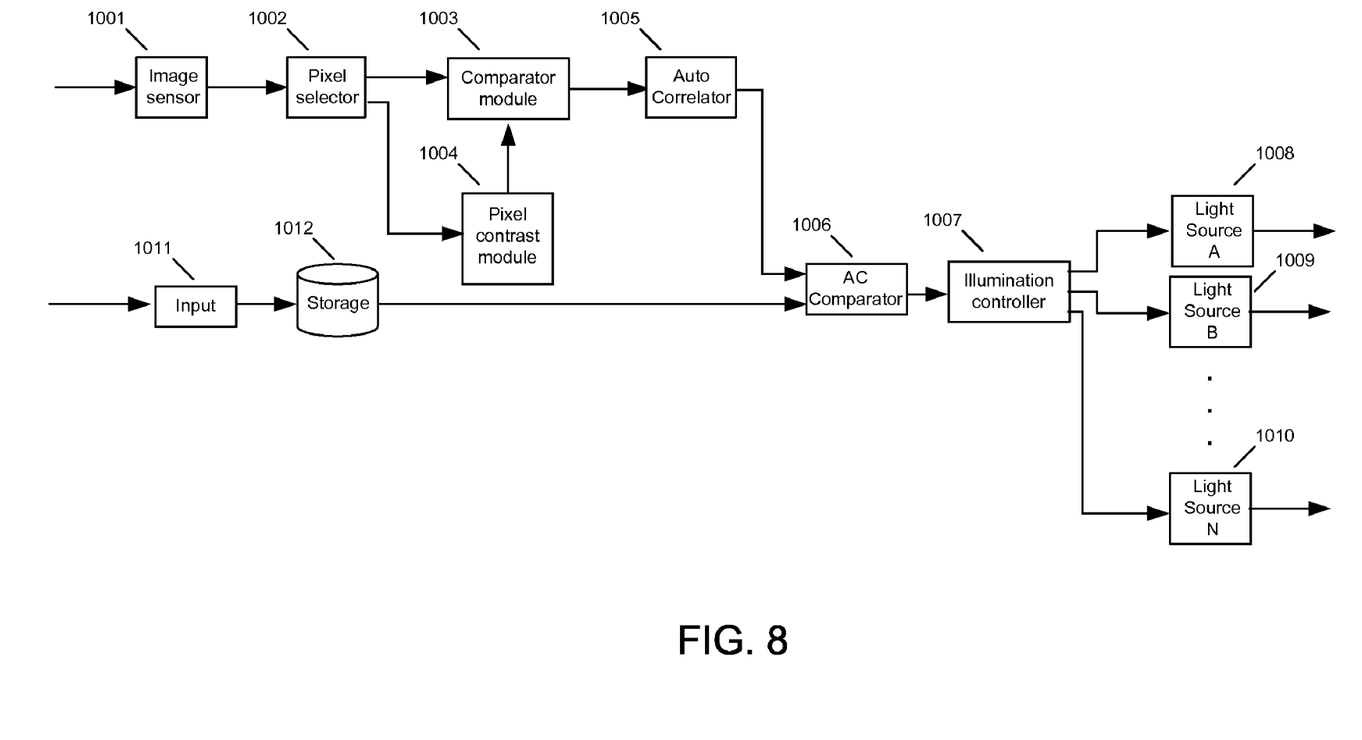
FIG. 8 is a block diagram illustrating another example of an apparatus for selecting an illumination method in an input device according to one embodiment.

FIG. 8 is a block diagram illustrating another example of an apparatus for selecting an illumination method and corresponding tracking algorithm in an input device such as a mouse. The apparatus may include an image sensor 1001 that receives an image input from a tracking surface. The image sensor 1001 may include an array, for example, an array similar to array 226 illustrated in FIG. 3. Also, the array may be located on an IC. In one example, the IC may be similar to IC 228 illustrated in FIG. 3. The image received may include various attributes including contrast differences between pixels in the image. Light may be emitted from the mouse to the tracking surface and may be reflected back to the mouse and received at the image sensor 1001 at an array. In addition, the apparatus may optionally include an input 1011 for receiving a selection criteria for selecting a light source and corresponding tracking algorithm. For example, the input 1011 may include a switch (e.g., a switch similar to switch 255 illustrated in FIG. 3) for manually inputting a desired light source. Alternatively, the input 1011 may include a user interface for receiving a desired threshold value for an image contrast or a threshold value of differences in pixel contrast between different pixels such as pixels that are adjacent to each other. For example, a user may input a desired threshold value via input 1011. The desired threshold value may be stored in storage 1012. Alternatively, the threshold value may be stored in storage 1012 without input from the user (e.g., factory-installed).

The image sensor 1001 may receive the input image (e.g., from a work surface) and may provide the input image to the pixel selector 1002. The pixel selector 1002 may select a pixel from the array of pixels in the image. Information on the contrast of the selected pixel and/or pixels that adjoin, abut, are neighboring, or are adjacent to the selected pixel may also be obtained. Image contrast may be further characterized in the pixel contrast module 1004 which may determine the contrast differences between selected pixels and any of the selected pixels' neighboring pixels.

The comparator module 1003 may compare the pixel contrast to that of pixels that are next to, adjacent, or neighboring the selected pixel. In some examples, the comparator module 1003 may be located on an IC such as an IC similar to IC 228 illustrated in FIG. 3. In some examples, the IC may further include computational logic such as computational logic 38 illustrated in FIG. 3. Alternatively, the comparator module may be located on the array itself and may be further controlled by processing circuitry similar to processing circuitry 34 illustrated in FIG. 3. The IC may further include an auto correlator 1005. For example, the auto correlator 1005 may be part of the computational logic or processing circuitry of the IC. The auto correlator 1005 may receive pixel contrast data from the comparator module 1003 and may determine, based on the received data, at least one autocorrelation (AC) parameter. The AC comparator 1006 may compare the AC parameters or contrast levels of the received image with a predetermined contrast threshold value. The contrast threshold value may be stored in storage 1012 in one embodiment. For example, a user may optionally input a desired threshold value via input 1011 and the input threshold value may be stored in storage 1012. Based on the image contrast, the illumination controller 1007 may control at least one light source. In the example illustrated in FIG. 8, the illumination controller 1007 selects a corresponding light source from a plurality of light sources (i.e., Light Source A 1008, Light Source B 1009, . . . , Light Source N 1010, in the example illustrated in FIG. 8). Also, as set forth above, the light source may be selected based on both the contrast level and the illumination level of the received light.

Figure 9:
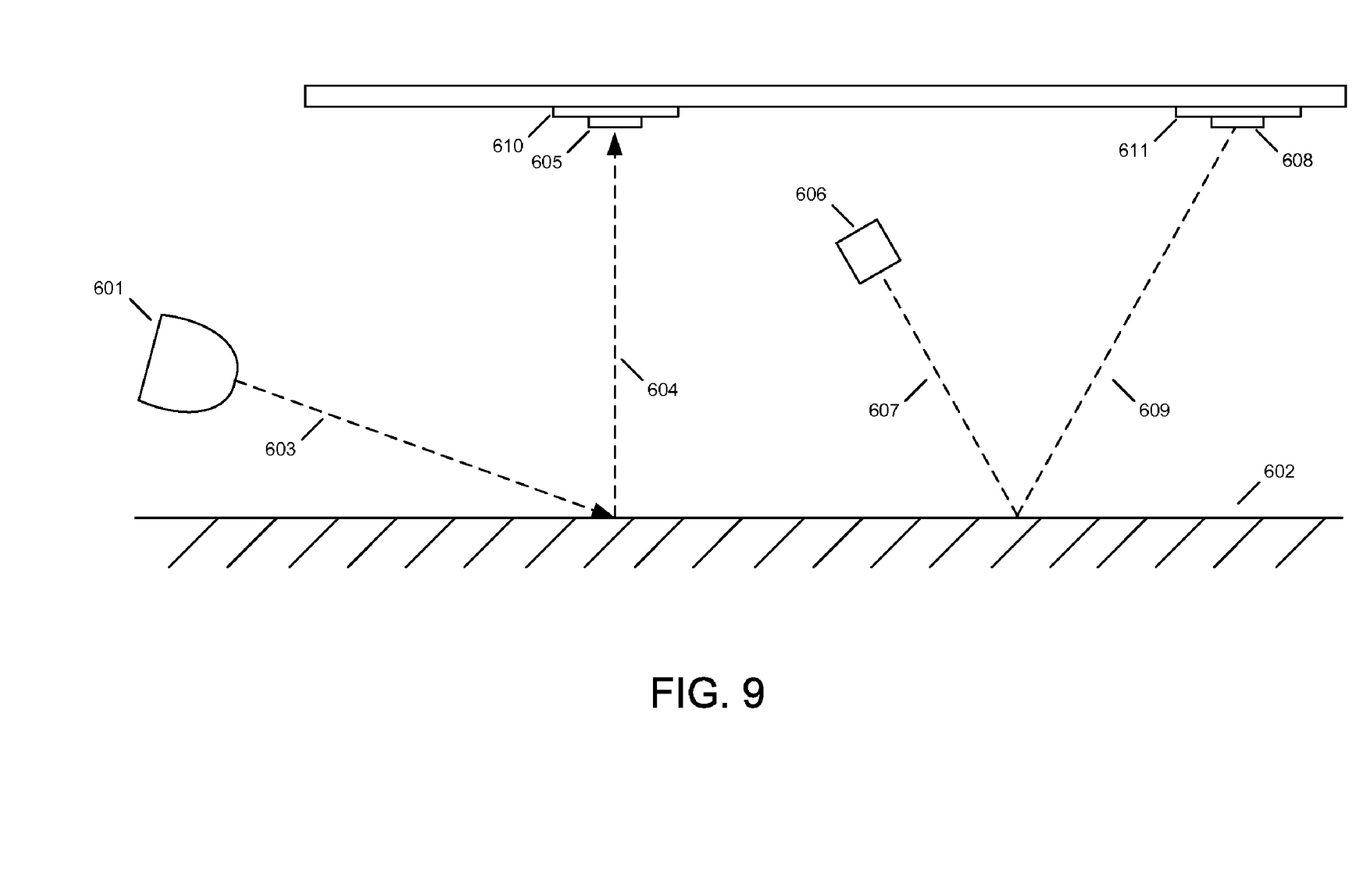
FIG. 9 is a block diagram of a mouse containing at two separate light sources and two separate receiving arrays.

FIG. 9 illustrates another embodiment of a mouse containing at least two separate light sources in which each light source emits an incident light at a different portion of the work surface. In this example, an LED light source 601 emits grazing illumination 603 onto the tracking surface 602 to provide a reflected light beam 604. The reflected light beam 604 is received at an array 605 of an IC 610. Also, the input device may further contain a separate light source 606 for emitting a light beam 607 at the tracking surface 602. The light beam 607 strikes the tracking surface 602 at a different point on the tracking surface as compared to the light beam 603 from the LED light source 601. The reflected beam of light 609 from the incident light beam 607 from the separate light source 606 may be received at array 608 of IC 611. The array 608 is positioned at a different location in the device relative to the array 605. Also, the separate light source 606 may be oriented to the tracking surface 602 at a different angle as compared to the LED light source 601. For example, the LED light source 601 may be positioned to emit a light beam 603 that is approximately 20 degrees or less from the work surface 602 and the separate light source 606 may be positioned to emit a light beam 607 that is approximately 20 degrees or less from a vertical or perpendicular orientation.

IC 610 and IC 611 may each contain logic for determining which array and light source (601 or 606) to use. The determination of which light source to use and which corresponding tracking algorithm to use may be based on any selection criteria including, for example, a manual input (e.g., a switch position) or selection criteria based on the status of the device or tracking surface 602. Selection of a light source and corresponding tracking algorithm may also be determined automatically, for example, based on attributes of the tracking surface 602. For example, if the tracking surface 602 is highly reflective or glossy, light source 606 and corresponding tracking algorithm may be selected. If the tracking surface 602 is not highly reflective or non-glossy, then light source 601 and corresponding tracking algorithm may be selected. As set forth above, logic contained in the IC 610 or the IC 611 may perform the selection based on tracking surface attributes such as illumination level or contrast level. In addition, one IC may control more than one array. Thus, in one example, more than one array is included on the IC for detecting light and each of the more than one arrays may be controlled by a single IC. In another example, more than one array is included on the IC for detecting light and each of the more than one arrays may be controlled by any number of ICs (e.g., 2, 3, 4, 5, 6, etc.). In yet another example, one IC may control all of the arrays included on the IC.

It is understood that aspects of the present invention can take many forms and aspects. The embodiments shown herein are intended to illustrate rather than to limit the invention, it being appreciated that variations may be made without departing from the spirit of the scope of the invention. Although illustrative aspects of the invention have been shown and described, a wide range of modification, change and substitution is intended in the foregoing disclosure and in some instances some features of the present invention may be employed without a corresponding use of the other features. Accordingly, it is appropriate that the appended claims be construed broadly and in a manner consistent with the scope of the invention. As used herein (including the claims), "light" includes emissions in the visible and/or non-visible portions of the electromagnetic spectrum. In the claims, various portions are prefaced with letter or number references for convenience. However, use of such references does not imply a temporal relationship not otherwise required by the language of the claims.

What is claimed is:

1. A method for modifying illumination sources for an input device, the method comprising:
    activating a first illumination source to illuminate a surface external to the input device with light emitted from the first illumination source;
    detecting a first illumination level from the first illumination source;
    comparing the first illumination level to a first threshold value;
    when the first illumination level exceeds the first threshold value, using the first illumination source for the input device; and
    otherwise, when the first illumination level is less than the first threshold value:
        detecting a contrast level from the first illumination source;
        comparing the contrast level to a second threshold value calculated as an averaged value of a plurality of autocorrelation values for only non-edge pixels obtained from a captured image of the surface external to the input device;
        when the contrast level is less than the second threshold value, using a second illumination source for the input device; and
        otherwise, when the contrast level is greater than the second threshold value, using the first illumination source for the input device.

2. The method of claim 1, further comprising comparing the contrast level with the plurality of autocorrelation values calculated as one of an averaged absolute value of a difference between adjacent non-edge pixel outputs and an averaged value of a difference squared between adjacent non-edge pixel outputs.

3. The method of claim 2, wherein $$AC(i, j) = \sum_{x=2}^{q-1}\sum_{y=2}^{r-1}[\text{ABS}(\text{Out}(p(x, y)) - \text{Out}(p(x+i, y+j)))],$$

AC(i,j) is an autocorrelation value for non-edge pixels in an array relative to the i,j neighbors of said non-edge pixels,
i=−1, 0 or 1,
j=−1, 0 or 1,
the array has q pixels in an X direction and r pixels in a Y direction, with q and r both being greater than three,
p(x,y) is a pixel located at location x, y in the array,
p(x+i, y+j) is a neighbor pixel of pixel p(x,y),
Out(p(x,y)) is an output value corresponding to pixel p(x, y),
Out(p(x+i, y+j)) is an output value corresponding to pixel p(x+i, y+j), and wherein the averaged absolute value is calculated based on values for AC(−1, −1), AC(−1,0), AC(−1,1), AC(0,−1), AC(0,1), AC(1,−1), AC(1,0) and AC(1,1).

4. The method of claim 2, wherein $$AC(i, j) = \sum_{x=2}^{q-1}\sum_{y=2}^{r-1}[\text{Out}(p(x, y)) - \text{Out}(p(x+i, y+j))]^2,$$

AC(i,j) is an autocorrelation value for non-edge pixels in an array relative to the i,j neighbors of said non-edge pixels,
i=−1, 0 or 1,
j=−1, 0 or 1,
the array has q pixels in an X direction and r pixels in a Y direction, with q and r both being greater than three,
p(x,y) is a pixel located at location x, y in the array,
p(x+i, y+j) is a neighbor pixel of pixel p(x,y),
Out(p(x,y)) is an output value corresponding to pixel p(x, y),
Out(p(x+i, y+j)) is an output value corresponding to pixel p(x+i, y+j), and wherein the averaged value is calculated based on values for AC(−1,−1), AC(−1,0), AC(−1,1), AC(0,−1), AC(0,1), AC(1,−1), AC(1,0) and AC(1,1).

5. The method of claim 1, wherein one of the first and second illumination sources is a grazing source illuminating the surface at a first angle, the other of the first and second illumination sources is a specular source illuminating the surface at a second angle, and the second angle is closer to a normal from the surface than the first angle.

6. The method of claim 5, wherein at least one of the first and second illumination sources is a laser.

7. The method of claim 6, wherein one of the first and second sources is the laser and the other of the first and second sources is a light emitting diode.

8. The method of claim 1, wherein one of the first and second sources is a laser and the other of the first and second sources is a light emitting diode.

9. The method of claim 1, wherein a light beam from the first illumination source and a light beam from the second illumination source are non-coincident.

10. A method for modifying illumination sources for an input device, the method comprising:
    activating a first illumination source to illuminate a surface external to the input device with light emitted from the first illumination source;
    detecting a first illumination level from the first illumination source;
    comparing the first illumination level to a first threshold value;
    when the first illumination level exceeds the first threshold value,
        using the first illumination source for the input device, and
        otherwise, using a second illumination source for the input device;
    detecting a contrast level from the first illumination source;
    comparing the contrast level to a second threshold value calculated as an averaged value of a plurality of autocorrelation values for only non-edge pixels obtained from a captured image of the surface external to the input device; and
    when the contrast level exceeds the second threshold value,
        using the first illumination source for the input device, and
        otherwise, using the second illumination source for the input device.

11. The method of claim 10, further comprising comparing the contrast level with the plurality of autocorrelation values calculated as one of an averaged absolute value of a difference between adjacent non-edge pixel outputs and an averaged value of a difference squared between adjacent non-edge pixel outputs.

12. The method of claim 11, wherein $$AC(i, j) = \sum_{x=2}^{q-1} \sum_{y=2}^{r-1} [ABS(Out(p(x, y)) - Out(p(x+i, y+j)))],$$

AC(i,j) is an autocorrelation value for non-edge pixels in an array relative to the i, j neighbors of said non-edge pixels,
i=−1, 0 or 1,
j=−1, 0 or 1,
the array has q pixels in an X direction and r pixels in a Y direction, with q and r both being greater than three,
p(x,y) is a pixel located at location x, y in the array,
p(x+i,y+j) is a neighbor pixel of pixel p(x,y),
Out(p(x,y)) is an output value corresponding to pixel p(x, y),
Out(p(x+i,y+j)) is an output value corresponding to pixel p(x+i,y+j), and wherein the averaged absolute value is calculated based on values for AC(−1,−1), AC(−1,0), AC(−1,1), AC(0,−1), AC(0,1), AC(1,−1), AC(1,0) and AC(1,1).

13. The method of claim 11, wherein $$AC(i, j) = \sum_{x=2}^{q-1} \sum_{y=2}^{r-1} [Out(p(x, y)) - Out(p(x+i, y+j))]^2$$

AC(i,j) is an autocorrelation value for non-edge pixels in an array relative to the i, j neighbors of said non-edge pixels,
i=−1, 0 or 1,
j=−1, 0 or 1,
the array has q pixels in an X direction and r pixels in a Y direction, with q and r both being greater than three,
p(x,y) is a pixel located at location x, y in the array,
p(x+i,y+j) is a neighbor pixel of pixel p(x,y),
Out(p(x,y)) is an output value corresponding to pixel p(x, y),
Out(p(x+i,y+j)) is an output value corresponding to pixel p(x+i,y+j), and wherein the averaged value is calculated based on values for AC(−1,−1), AC(−1,0), AC(−1,1), AC(0,−1), AC(0,1), AC(1,−1), AC(1,0) and AC(1,1).

14. The method of claim 10, wherein one of the first and second illumination sources is a grazing source illuminating the surface at a first angle, the other of the first and second illumination sources is a specular source illuminating the surface at a second angle, and the second angle is closer to a normal from the surface than the first angle.

15. The method of claim 14, wherein at least one of the first and second illumination sources is a laser.

16. The method of claim 15, wherein one of the first and second sources is the laser and the other of the first and second sources is a light emitting diode.

17. The method of claim 10, wherein one of the first and second sources is a laser and the other of the first and second sources is a light emitting diode.

18. The method of claim 10, wherein a light beam from the first illumination source and a light beam from the second illumination source are non-coincident.

* * * * *